350-287.

SR 11-19-74 OR 3,848,973

United States Patent [19]

Merz et al.

[11] 3,848,973

[45] Nov. 19, 1974

[54] PRISM HOLDER FOR A DIGITAL LIGHT DEFLECTION SYSTEM

[75] Inventors: Josef Merz, Hamburg, Germany; Johannes Van Esdonk; Joannes Franciscus Maria Janssen, both of Emmasingel, Eindhoven, Netherlands

[73] Assignee: U.S. Philips Corporation, New York, N.Y.

[22] Filed: Nov. 2, 1972

[21] Appl. No.: 303,249

[30] Foreign Application Priority Data

Nov. 6, 1971 Germany .......................... 2155270

[52] U.S. Cl. .................. 350/287, 350/147, 350/318

[51] Int. Cl. ............................................ G02b 7/18

[58] Field of Search ........... 350/150, 157, 252, 245, 350/179, 312, 147, 148, 318

[56] References Cited

UNITED STATES PATENTS

| | | | |
|---|---|---|---|
| 1,118,187 | 11/1914 | Depue | 350/252 |
| 1,540,781 | 6/1925 | Keuffel | 350/252 |
| 2,552,938 | 5/1951 | Cojan | 350/287 |
| 2,668,469 | 2/1954 | Gabel | 350/252 |
| 3,572,907 | 3/1971 | Cindrich | 350/312 |

OTHER PUBLICATIONS

Schmidt, "A High Speed Digital Light Beam Deflector," Sept 4, 1964, Physics Letters, October 1964, p. 205, 206.

*Primary Examiner*—Ronald L. Wibert
*Assistant Examiner*—Michael J. Tokar
*Attorney, Agent, or Firm*—Frank R. Trifari; Simon L. Cohen

[57] ABSTRACT

A prism holder for a digital light deflection system in which the holder is plate-shaped and has an aperture which is larger than the prism, the prism bearing on one side with its corners on a flat ring and being enclosed on the other side by means of fixing members.

6 Claims, 8 Drawing Figures

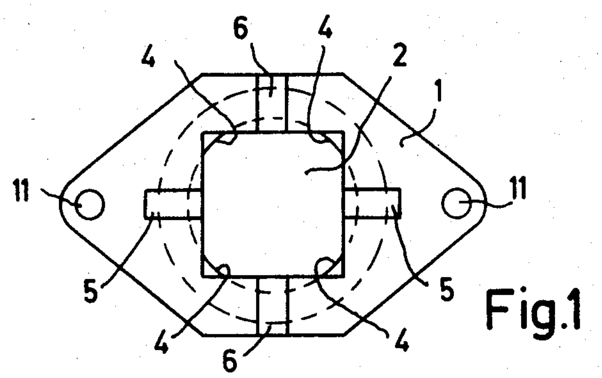
Fig.1
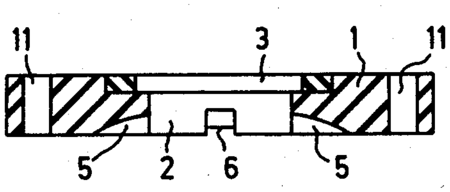
Fig.2
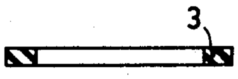
Fig.3
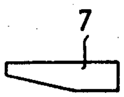
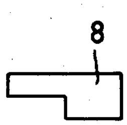
Fig.4 Fig.5 Fig.6 Fig.7
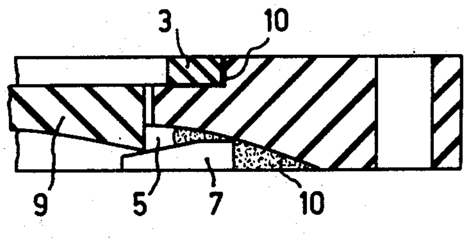
Fig.8

PRISM HOLDER FOR A DIGITAL LIGHT DEFLECTION SYSTEM

The invention relates to a prism holder for a digital light deflection system, which system comprises one or more prisms and Kerr cells.

The system is accommodated in an envelope which is filled with the liquid required for the Kerr cells, for example, nitrobenzene. The prisms consist of calcite.

It has been found that the connection of the prisms in an envelope is not simple with such a system. The known manner of securing prisms by means of a rather soft cement or adhesive is not possible in such a system since the cement will dissolve in the liquid. Soldering the prisms gives rise to fracture of the prisms if these are soldered only with one side to a holder. The soldering materials which are to be considered for this purpose are silver-copper solder or vitreous soldering material. Apparently, said soldering materials are too hard and not flexible enough to prevent fracture of the prisms.

It has been found, however, that the said difficulty can be avoided entirely in a prism holder for a digital light deflection system, which system comprises one or more prisms and Kerr cells which are accommodated in a vessel which is filled with the liquid necessary for the Kerr cells, if, according to the invention, the holder consists of a plate-shaped member which has an aperture the dimensions of which are larger than the corresponding dimensions of a prism in which on one side of the aperture supporting points are present on which the prism can bear with at least a part of its outer edge, while on the other side of the aperture fixing members can be secured to the plate-shaped member which enclose the prism in the aperture without exerting pressure on it.

When using a rectangular aperture for a rectangular prism the supporting points may be formed by a flat ring in which the diameter of the aperture of the ring is smaller than the diagonal of the rectangular aperture for the prism face which extends parallel to the plane of the ring. The prism then bears with its corners on the ring. However, a ring may also be used which has internal projections on which the prism can bear.

The fixing members preferably consist of rods which have a bevelled or narrower part and which can be secured in grooves of the holder, preferably by means of soldering, in which they enclose the prism in the aperture without play but without exerting pressure on the prism.

The holder, the ring and the fixing members preferably consist of a suitable ceramic material, for example, pure $Al_2O_3$, while the fixing members are secured in the grooves by means of a vitreous soldering material. When the fixing member has a bevelled edge the prism is just enclosed without play and without the fixing member exerting pressure on the prism.

The invention will be described in greater detail with reference to the drawing, in which FIG. 1 is an underneath view and FIG. 2 is a longitudinal cross-sectional view of a holder according to the invention, while FIG. 3 is a cross-sectional view of a first ring, and FIGS. 4 and 5 are a side view and a plan view of a fixing member, while, FIGS. 6 and 7 are a side view and a plan view of another fixing member, and FIG. 8 is a cross-sectional view of a part of the holder with prisms.

Reference numeral 1 in FIG. 1 denotes a plate-shaped member of a ceramic material having an aperture 2 which is larger than the corresponding dimensions of a prism. The aperture 2 has a widened portion on one side in which a flat ceramic ring 3 is soldered by means of a readily melting type of glass (melting temperature approximately 385° C.

The inside diameter of the ring 3 is smaller than the diagonal of the aperture 2 so that a prism corresponding to said aperture 2 is supported at the four corners by the ring 3. The parts 4 of the ring 3 thus form supporting points on one side of the aperture 2.

In the oppositely located surface of the member 1 gooves 5 and 6 are provided in which fixing members 7 or 8 can be secured, for example, by means of the above-mentioned readily melting type of glass. Dependent upon the thickness and the position of the prism, two fixing members 7 or 8 are used and soldered in the grooves 5 or 6. The members 8 are suitable for thicker prisms which project farther above the bottom of the grooves 5 and 6. The thin part of the members 8 then encloses the prism in the aperture 2. In FIG. 8 a prism 9 is fixed by means of a member 7. By sliding said member 7 in the groove 5 it can be achieved that the prism 9 is enclosed just without play between the supporting points 4 of the ring 3 and the member 7 without the fixing member 7 exerting pressure on the prism 9. The fixing member 7, as well as the ring 3, are then secured to the member 1 by means of the readily melting type of glass 10.

When fixing members 8 are used, tolerances are taken up by the thickness of the soldering layer 10.

When a ceramic material is used for the holder 1, the advantage exists that the coefficient of thermal expansion is approximately equal to that of the prism although a prism of calcite has different coefficients of expansion in the three axial directions. Since the prism is not rigidly secured in the member 1, it can extend sufficiently freely so that fracture of the prism is prevented during cooling after soldering the ring 3 and the fixing members 7 or 8. A further advantage of ceramic material is that it can easily be cleaned from contaminations during rinsing the vessel with the liquid for the Kerr cells. The holes 11 in the plate-shaped member 1 serve to thread the holders on ceramic rods, while using spacing members, said rods being secured in the vessel of the light deflection system.

Although only a holder of a ceramic material has been described, it is also alternatively possible to manufacture the holder, the ring and the fixing members from a suitable metal.

What is claimed is:

1. A prism holder for a digital light deflection system, which system comprises one or more rectangular prisms and Kerr cells accommodated in a vessel filled with the liquid necessary for the Kerr cells; the holder comprising a plate-shaped member having a substantially rectangular aperture the dimensions of which are larger than the corresponding dimensions of a rectangular prims, a ring shaped support member on one side of said plate-shaped member and concentric with said aperture, said ring shaped support member having a diameter smaller than the diagonal and larger than the smallest side of said aperture and forming supporting points on one side of the aperture on which the prism can bear with at least a part of its outer edge, and fixing members secured to the plate-shaped member on the other side thereof for enclosing the prism in the aperture without exerting pressure on it.

2. A prism holder as claimed in claim 1, further comprising fixing members having a bevelled edge for enclosing the prism.

3. A prism holder as claimed in claim 1, wherein the prism is enclosed by fixing members which have a wide and a relatively narrower portion.

4. A prism holder as claimed in claim 1, wherein grooves for securing the fixing members are provided in the surface of the holder.

5. A prism holder as claimed in claim 1, wherein the holder, the ring and the fixing members consist of a ceramic material.

6. A prism holder as claimed in claim 1, wherein the holder has additional apertures with which it can be threaded on supporting rods that are fixed within the vessel.

* * * * *

PO-1050
(5/69)

UNITED STATES PATENT OFFICE
CERTIFICATE OF CORRECTION

Patent No. 3,848,973 Dated November 19, 1974

Inventor(s) Josef Merz, Johannes VAN ESDONK and J.F.M. JANSSEN

It is certified that error appears in the above-identified patent and that said Letters Patent are hereby corrected as shown below:

ON THE TITLE PAGE

"[30] Foreign Application Priority Data

Nov. 6, 1971 Germany...............2155270"

should read

--[30] Foreign Application Priority Data

Nov. 6, 1971 Germany...............P.2155270.5--;

Signed and sealed this 18th day of February 1975.

(SEAL)
Attest:

RUTH C. MASON
Attesting Officer

C. MARSHALL DANN
Commissioner of Patents
and Trademarks